US012639896B2

(12) United States Patent (10) Patent No.: US 12,639,896 B2
Hayakawa et al. (45) Date of Patent: May 26, 2026

(54) INFORMATION PROCESSING APPARATUS AND INFORMATION PROCESSING METHOD

(71) Applicant: SONY INTERACTIVE ENTERTAINMENT INC., Tokyo (JP)

(72) Inventors: Yuto Hayakawa, Tokyo (JP); Takanori Minamino, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 129 days.

(21) Appl. No.: 18/453,326

(22) Filed: Aug. 22, 2023

(65) Prior Publication Data

US 2024/0078767 A1 Mar. 7, 2024

(30) Foreign Application Priority Data

Aug. 31, 2022 (JP) ................................. 2022-137724

(51) Int. Cl.
G06T 19/00 (2011.01)
G06F 3/01 (2006.01)
(Continued)

(52) U.S. Cl.
CPC ............ G06T 19/006 (2013.01); G06F 3/012 (2013.01); G06T 7/70 (2017.01); G06T 17/20 (2013.01);
(Continued)

(58) Field of Classification Search
CPC ........ G06F 3/012; G06F 3/0304; G06F 3/011; G06F 3/04815; G06F 3/0425;
(Continued)

(56) References Cited

U.S. PATENT DOCUMENTS

| 11,055,910 | B1 * | 7/2021 | Deng | .................... | G06V 20/647 |
| 11,127,212 | B1 * | 9/2021 | Wilens | ................ | H04N 9/3179 |

(Continued)

FOREIGN PATENT DOCUMENTS

| JP | 2019534510 A | 11/2019 |
| JP | 2021060953 A | 4/2021 |

(Continued)

OTHER PUBLICATIONS

JP2022-137724, "Office Action," Jan. 6, 2026, 6 pages.

*Primary Examiner* — Xilin Guo

(74) *Attorney, Agent, or Firm* — Kilpatrick Townsend & Stockton LLP

(57) ABSTRACT

Provided is an information processing apparatus including a map generating section that detects a surface of a real object in a three-dimensional space on the basis of a camera image captured with a camera of a head-mounted display and generates map data representing information regarding the detected surface, a position estimating section that collates the map data and the camera image and estimates a position of a user used for execution of an application, and a look-around screen generating section that causes the head-mounted display to display a synthesized image on which an object representing the detected surface of the real object is superimposed on an image of a corresponding surface in the camera image, in a period of generation of the map data.

20 Claims, 9 Drawing Sheets

(51) Int. Cl.
    *G06T 7/70*       (2017.01)
    *G06T 17/20*     (2006.01)
    *A63F 13/52*     (2014.01)

(52) U.S. Cl.
    CPC ....... *A63F 13/52* (2014.09); *A63F 2300/8082*
                                        (2013.01)

(58) Field of Classification Search
    CPC ......... G06T 19/006; G06T 17/20; G06T 7/70;
                G06T 2207/10028; G06T 19/00; A63F
                2300/8082; A63F 13/52; G06V 20/64;
                                        G06V 20/20
    See application file for complete search history.

(56)                       References Cited

U.S. PATENT DOCUMENTS

| | | | |
|---|---|---|---|
| 2020/0342833 A1 | 10/2020 | Tsai et al. | |
| 2021/0201469 A1* | 7/2021 | Sharma | G06T 7/0002 |
| 2022/0215539 A1* | 7/2022 | Proksch | G06T 7/11 |
| 2023/0093342 A1* | 3/2023 | Murugappan | G06T 7/30 |
| 2023/0177788 A1* | 6/2023 | Aljubeh | G06T 19/20 |
| | | | 345/633 |
| 2023/0237696 A1 | 7/2023 | Inoue et al. | |

FOREIGN PATENT DOCUMENTS

| | | | |
|---|---|---|---|
| WO | 2018067801 A1 | 4/2018 |
| WO | 2021154558 A1 | 8/2021 |
| WO | 2021173850 A1 | 9/2021 |
| WO | 2022004503 A1 | 1/2022 |

* cited by examiner

F I G . 2
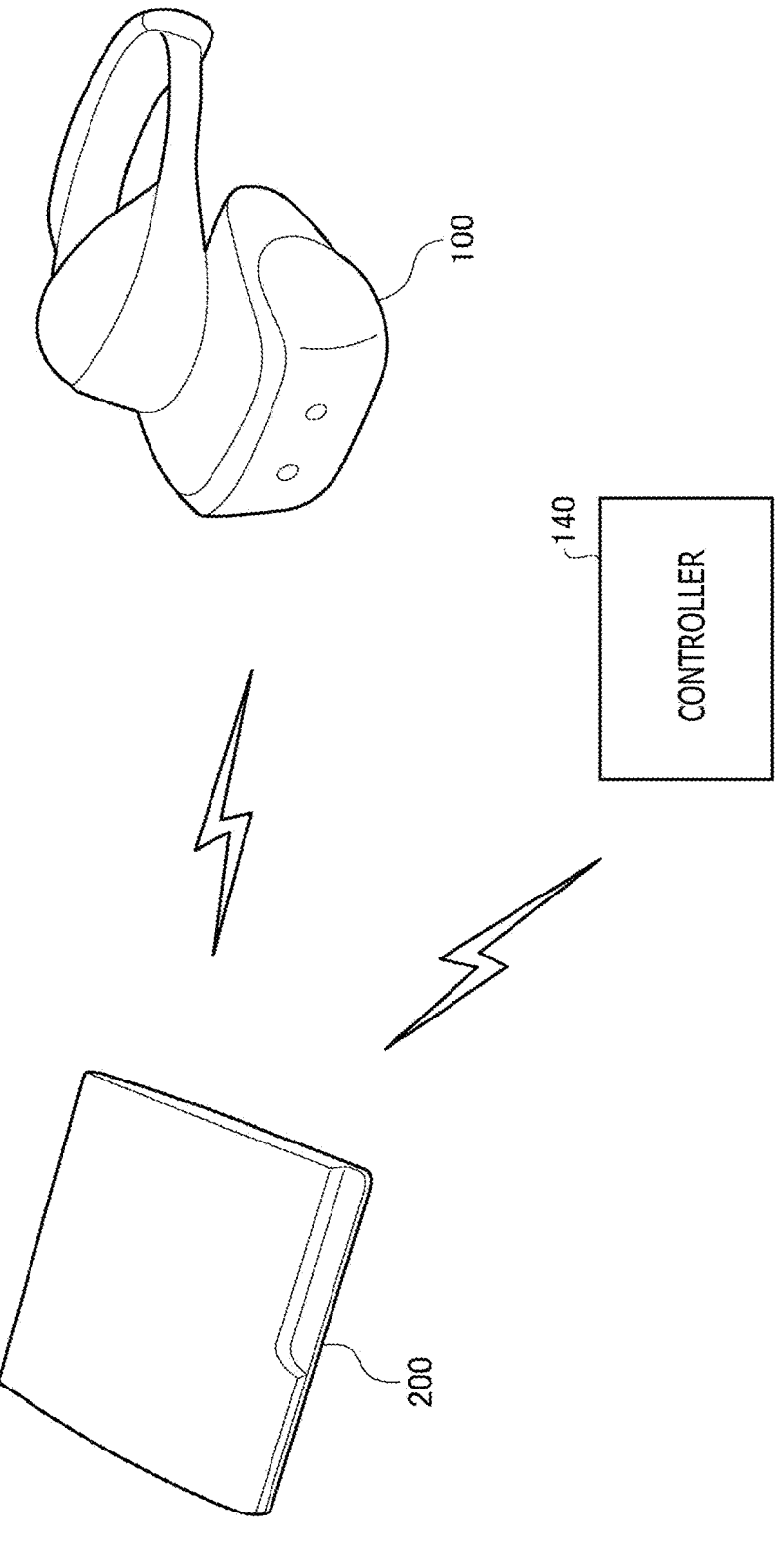

F I G . 6
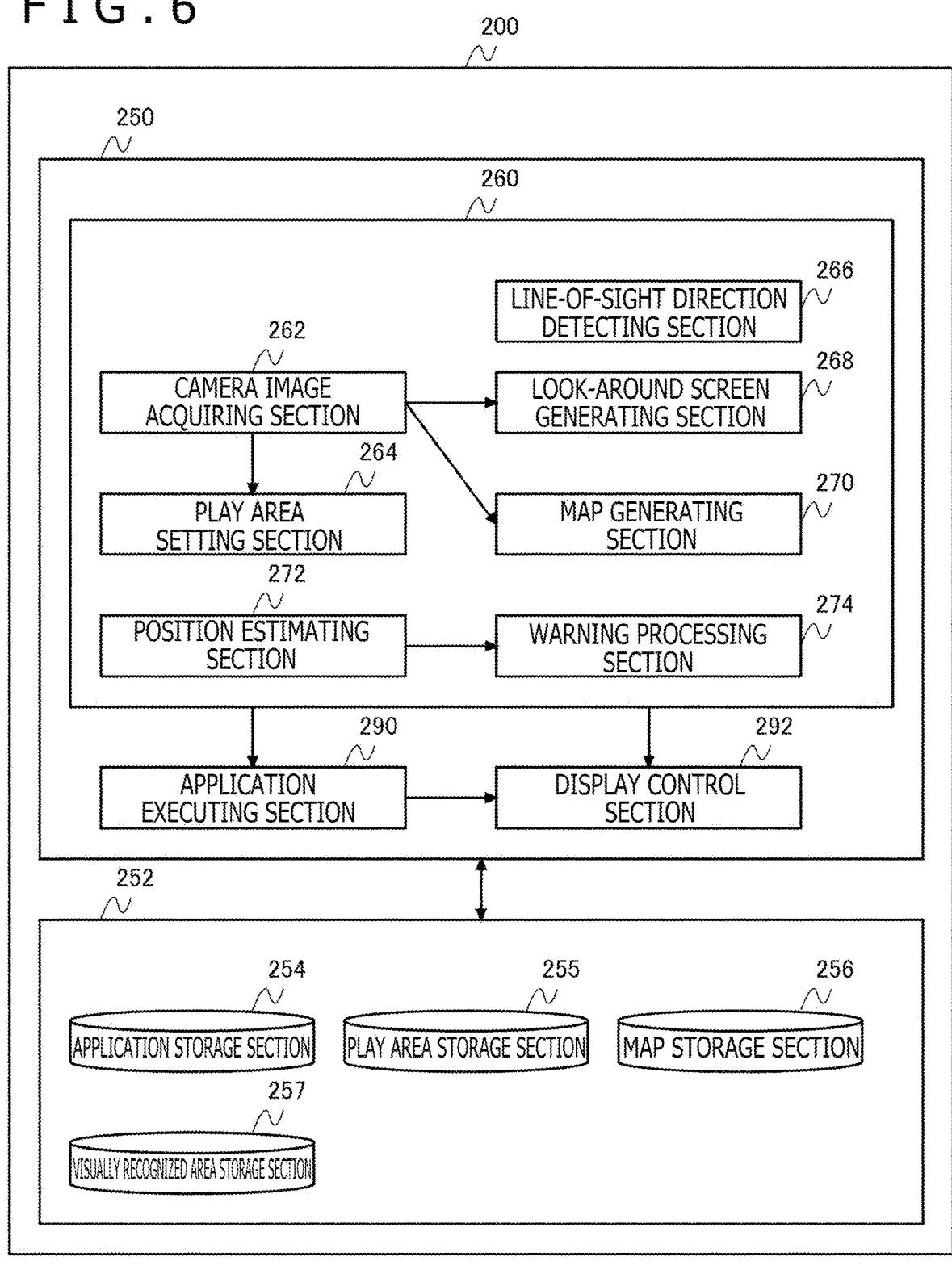

START

START ACQUIRING CAMERA IMAGE — S10

DISPLAY LOOK-AROUND SCREEN — S12

GENERATE MAP — S14

AUTO-DETECT PLAY AREA — S16

HAS SUFFICIENT AMOUNT OF DATA BEEN OBTAINED? — S18

N

Y

ACCEPT PLAY AREA EDIT OPERATION — S20

END

F I G . 1 2
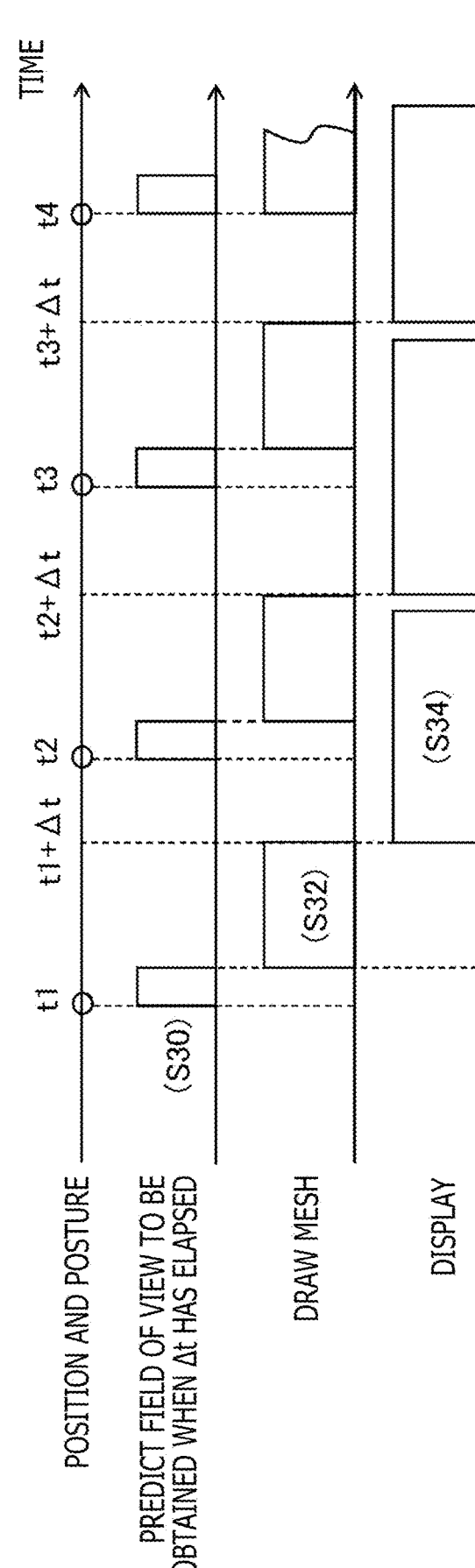

INFORMATION PROCESSING APPARATUS AND INFORMATION PROCESSING METHOD

CROSS REFERENCE TO RELATED APPLICATION

This application claims the benefit of Japanese Priority Patent Application JP 2022-137724 filed Aug. 31, 2022, the entire contents of which are incorporated herein by reference.

BACKGROUND

The present disclosure relates to an information processing apparatus that processes data related to a head-mounted display and an information processing method for processing such data.

Image display systems that allow users who have head-mounted displays on to view target spaces from free viewpoints have been used more widely. For example, there is known electronic content whose display target is a virtual three-dimensional space and that realizes virtual reality (VR) with images that are displayed on a head-mounted display according to a line-of-sight direction of a user. With use of a head-mounted display, it is also possible to enhance the sense of immersion into a video, enhance operability of an application such as a game, and so on. In addition, a walk-through system that allows a user who has a head-mounted display on to walk around virtually in a space displayed as a video, as the user moves physically, is also developed.

Enhancing a realistic feeling in an image world displayed on a head-mounted display and providing a high-quality user experience require precise acquisition of a position and a posture of a user's head and appropriate changes of a field of view of a display image according to the acquired position and posture. Accordingly, a technology for acquiring information regarding the position and posture of a user by acquiring in advance an environmental map of a space where the user is present and collating the environmental map with an image captured with a camera included in a head-mounted display has been put into practical use.

SUMMARY

In the technology described above, precision of an environmental map determines the quality of user experience at the time of operational use. On the other hand, since acquisition of an environmental map needs to be performed by each user in the environment where she/he is present, its precision or efficiency of work to acquire the environmental map tends to be dependent on individual circumstances such as the user herself/himself or objects that are present in a room. In order to stably obtain a highly precise environmental map, a mechanism that makes it possible to efficiently obtain a sufficient amount of necessary information with a minimum amount of burden on a user is demanded.

The present disclosure has been made in view of such a problem, and it is desirable to provide a technology that makes it possible to efficiently acquire a highly precise environmental map with use of images captured with cameras included in a head-mounted display.

In order to solve the problem described above, an example of the present disclosure relates to an information processing apparatus. The information processing apparatus includes a map generating section that detects a surface of a real object in a three-dimensional space on the basis of a camera image captured with a camera of a head-mounted display and generates map data representing information regarding the detected surface, a position estimating section that collates the map data and the camera image and estimates a position of a user used for execution of an application, and a look-around screen generating section that causes the head-mounted display to display a synthesized image on which an object representing the detected surface of the real object is superimposed on an image of a corresponding surface in the camera image, in a period of generation of the map data.

Another example of the present disclosure relates to an information processing method. The information processing method includes detecting a surface of a real object in a three-dimensional space on the basis of a camera image captured with a camera of a head-mounted display and generating map data representing information regarding the detected surface, collating the map data and the camera image and estimating a position of a user used for execution of an application, and causing the head-mounted display to display a synthesized image on which an object representing the detected surface of the real object is superimposed on an image of a corresponding surface in the camera image, in a period of generation of the map data.

Note that any combination of constituent elements above, and ones that are obtained by conversion of expressions of the present disclosure between a system, a computer program, a recording medium on which a computer program is recorded readably, a data structure, and the like are also effective as examples of the present disclosure.

According to the present disclosure, it is possible to efficiently acquire a highly precise environmental map with use of images captured with cameras included in a head-mounted display.

BRIEF DESCRIPTION OF THE DRAWINGS

FIG. 2 is a figure depicting a configuration example of an image display system in the present embodiment;

FIG. 6 is a block diagram depicting functional blocks of the image generating apparatus in the present embodiment;

FIGS. 9A and 9B are figures schematically depicting changes of a look-around screen before and after the map data generation according to the present embodiment;

FIG. 12 is a figure depicting a time chart of each process performed when the look-around screen generating section looks ahead at a position and a posture of a user's head and causes meshes to be displayed in the present embodiment.

DETAILED DESCRIPTION OF THE PREFERRED EMBODIMENT

Figure 1:
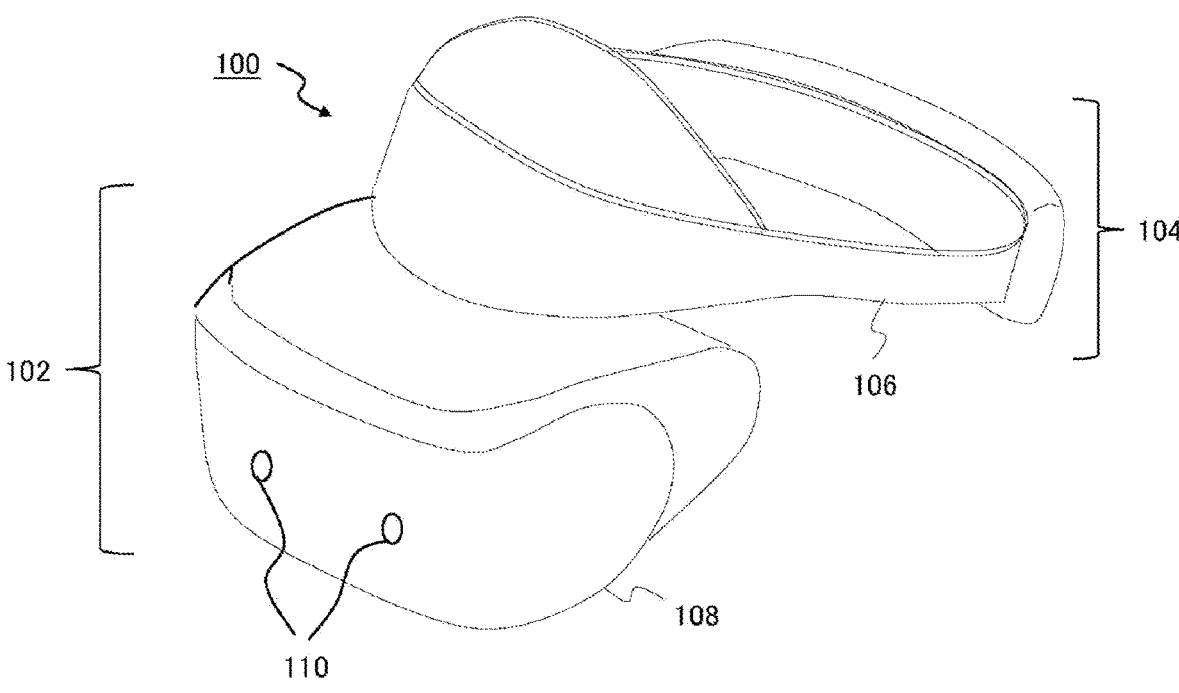
FIG. 1 is a figure depicting an appearance example of a head-mounted display in the present embodiment.

The present embodiment relates to an image display system that displays images of an application on a head-mounted display worn on a user's head. FIG. 1 depicts an appearance example of a head-mounted display 100. The head-mounted display 100 according to the present embodiment includes an output mechanism section 102 and an attachment mechanism section 104. The attachment mechanism section 104 includes a mounting band 106 that realizes fixing of the apparatus by surrounding the circumference of the user's head when the user wears it.

The output mechanism section 102 includes a housing 108 having such a shape as to cover left and right eyes of the user in a state where the user has the head-mounted display 100 on, and includes therein a display panel such that the display panel directly faces the eyes when the user has the head-mounted display 100 on. The display panel of the head-mounted display 100 according to the present embodiment is not transparent. That is, the head-mounted display 100 is a head-mounted display of a type that transmits light therethrough.

Eye pieces that are positioned between the display panel and the eyes of the user in a state where the user has the head-mounted display 100 on and that increase a viewing angle of the user may further be included inside the housing 108. The head-mounted display 100 may further include speakers or earphones at positions corresponding to ears of the user in a state where the user has the head-mounted display 100 on. In addition, the head-mounted display 100 has a built-in motion sensor, detects translational movement or rotary movement of the head of the user who has the head-mounted display 100 on, and, in turn, detects a position and a posture of the head at each time.

In addition, the head-mounted display 100 includes stereo cameras 110 on the front surface of the housing 108. The stereo cameras 110 capture a video of a surrounding real space in a field of view corresponding to a line of sight of the user. By displaying the captured images immediately, it is possible to realize what is generally called video see-through by which the user can see an unmodified situation of the real space in a direction that she/he faces. Further, by drawing virtual objects on images of real objects captured in the captured images, it is possible to realize augmented reality (AR).

FIG. 2 depicts a configuration example of the image display system of the present embodiment. The image display system includes the head-mounted display 100, an image generating apparatus 200, and a controller 140. The head-mounted display 100 is connected to the image generating apparatus 200 by wireless communication. The image generating apparatus 200 may further be connected to a server via a network. In this case, the server may provide, to the image generating apparatus 200, data regarding an online application such as a game that a plurality of users can participate in via the network.

The image generating apparatus 200 is an information processing apparatus that identifies a viewpoint position and a line-of-sight direction of the user on the basis of the position and posture of the head of the user who has the head-mounted display 100 on, generates a display image that reproduces a field of view according to the viewpoint position and line-of-sight direction, and outputs the display image to the head-mounted display 100. For example, the image generating apparatus 200 may generate, as display images, a virtual world which is the stage of an electronic game while causing the storyline of the game to progress or may display a moving image for being viewed or for information provision irrespective of whether the moving image is related to a virtual world or a real world. In addition, by causing the head-mounted display 100 to display a panoramic image with a wide angle of view with a viewpoint of the user at its center, a deep sense of immersion into a display world can be given to the user. Note that the image generating apparatus 200 may be a stationary game console or may be a personal computer (PC).

The controller 140 is a controller (e.g., a game controller) that is gripped by a hand of the user and receives input of user operation for controlling image generation at the image generating apparatus 200 and image display on the head-mounted display 100. The controller 140 is connected to the image generating apparatus 200 by wireless communication. As a modification example, the head-mounted display 100 and/or the controller 140 may be connected to the image generating apparatus 200 by wired communication via a signal cable or the like.

Figure 3:
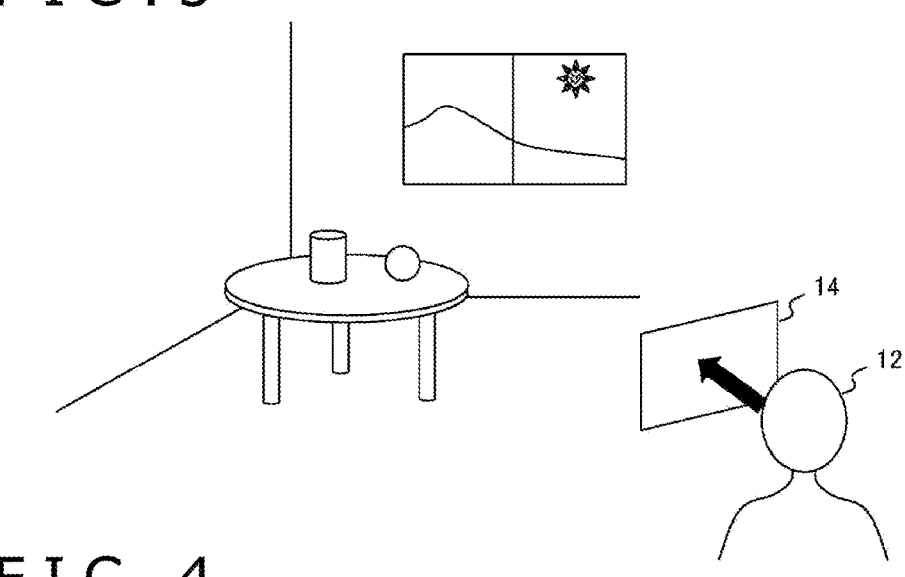
FIG. 3 is a figure for explaining an example of an image world that an image generating apparatus causes the head-mounted display to display in the present embodiment.

FIG. 3 is a figure for explaining an example of an image world that the image generating apparatus 200 causes the head-mounted display 100 to display. In this example, a state where a user 12 is present in a room which is a virtual space is created. As depicted in FIG. 3, objects such as walls, a floor, a window, a table, and objects on the table are arranged in a world coordinate system defining the virtual space. The image generating apparatus 200 draws a display image by defining, in the world coordinate system, a view screen 14 according to the viewpoint position and line-of-sight direction of the user 12 and causing images of the objects to be displayed on the view screen 14.

The image generating apparatus 200 acquires, from the head-mounted display 100, the viewpoint position and line-of-sight direction of the user 12 at a predetermined rate, and changes the position and direction of the view screen 14 according to the viewpoint position and line-of-sight direction of the user 12. As a result, it is possible to cause the head-mounted display 100 to display images of fields of view corresponding to the viewpoint of the user. In addition, by generating stereo images having a parallax and causing left and right areas of the display panel of the head-mounted display 100 to display the stereo images, the image generating apparatus 200 can also allow the user 12 to see a virtual space as a stereoscopic view. As a result, the user 12 can experience virtual reality as if she/he were in the room in the display world.

Figure 4:
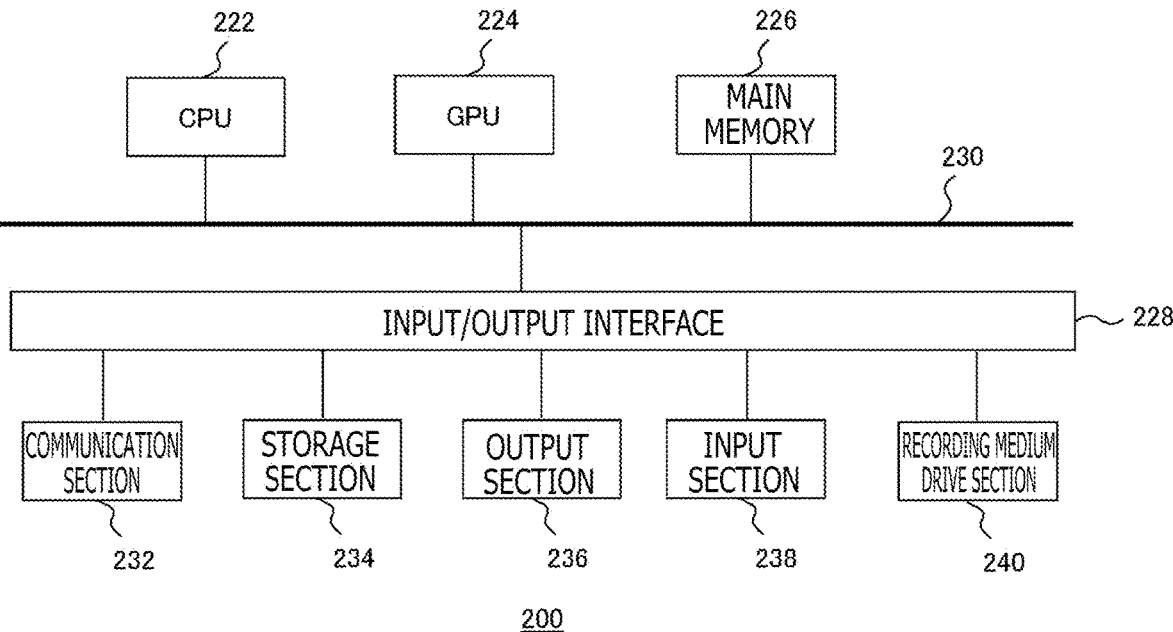
FIG. 4 is a figure depicting an internal circuit configuration of the image generating apparatus in the present embodiment.

FIG. 4 depicts an internal circuit configuration of the image generating apparatus 200. The image generating apparatus 200 includes a central processing unit (CPU) 222, a graphics processing unit (GPU) 224, and a main memory 226. These sections are interconnected via a bus 230. The bus 230 is connected further with an input/output interface 228. The input/output interface 228 is connected with a communication section 232, a storage section 234, an output section 236, an input section 238, and a recording medium drive section 240.

The communication section 232 includes peripheral equipment interfaces such as universal serial bus (USB) or Institute of Electrical and Electronics Engineers (IEEE) 1394 and network interfaces for a wired local area network (LAN), a wireless LAN, or the like. The storage section 234 includes a hard disk drive, a non-volatile memory, and the like. The output section 236 outputs data to the head-mounted display 100. The input section 238 accepts data input from the head-mounted display 100, and also accepts data input from the controller 140. The recording medium drive section 240 drives a removable recording medium such as a magnetic disc, an optical disc, or a semiconductor memory.

The CPU 222 performs overall control of the image generating apparatus 200 by executing an operating system stored on the storage section 234. In addition, the CPU 222 executes various types of programs (e.g., VR game applications, etc.) that are read out from the storage section 234 or the removable recording medium and loaded onto the main memory 226 or downloaded via the communication section 232. The GPU 224 has a function of a geometry engine and a function of a rendering processor, performs a drawing process in accordance with a drawing command from the CPU 222, and outputs a drawing result to the output section 236. The main memory 226 includes a random access memory (RAM), and stores programs and data required for processes.

Figure 5:
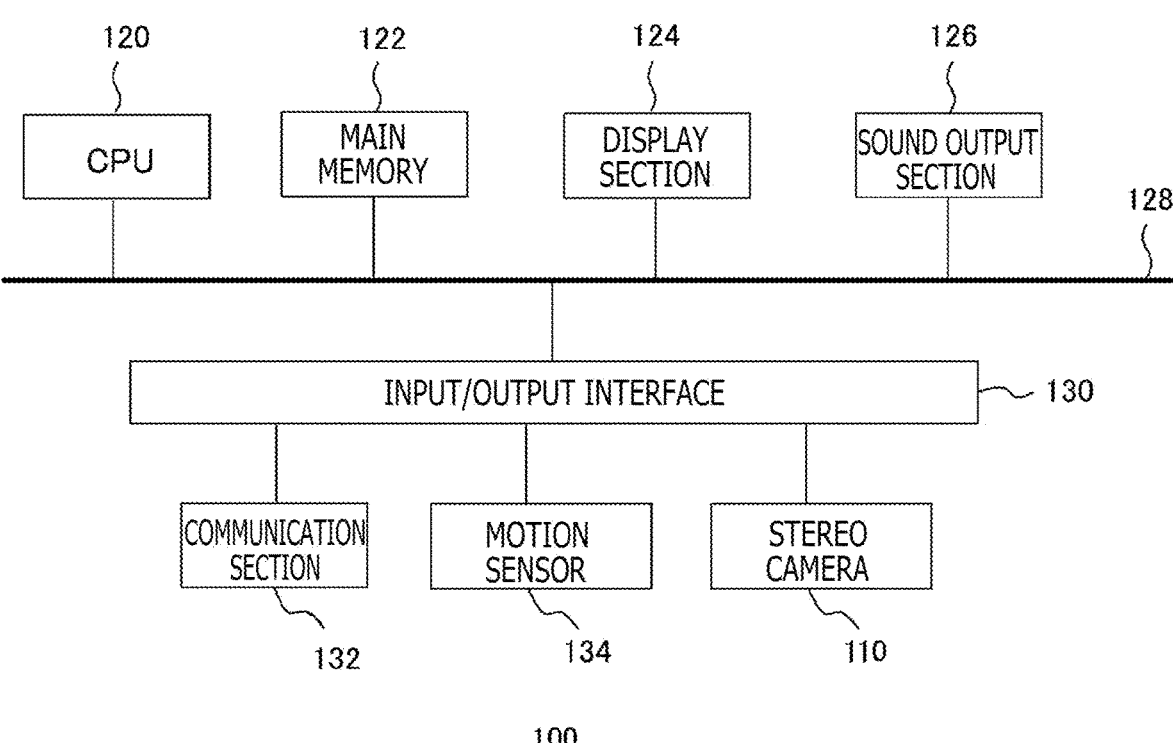
FIG. 5 is a figure depicting an internal circuit configuration of the head-mounted display in the present embodiment.

FIG. 5 depicts an internal circuit configuration of the head-mounted display 100. The head-mounted display 100 includes a CPU 120, a main memory 122, a display section 124, and a sound output section 126. These sections are interconnected via a bus 128. The bus 128 is connected further with an input/output interface 130. The input/output interface 130 is connected with a communication section 132 including a wireless communication interface, a motion sensor 134, and the stereo cameras 110.

The CPU 120 processes information acquired from each section of the head-mounted display 100 via the bus 128, and also supplies data regarding display images or sounds acquired from the image generating apparatus 200, to the display section 124 and the sound output section 126. The main memory 122 stores programs and data required for processes at the CPU 120.

The display section 124 includes a display panel such as a liquid crystal panel or an organic electroluminescent (EL) panel, and displays images in front of the eyes of the user who has the head-mounted display 100 on. The display section 124 may realize stereoscopic viewing by displaying a pair of stereo images in areas corresponding to the left and right eyes. The display section 124 may further include a pair of lenses that are positioned between the display panel and the eyes of the user in a state where the user has the head-mounted display 100 on and that increases the viewing angle of the user.

The sound output section 126 includes speakers or earphones provided at positions corresponding to the ears of the user in a state where the user has the head-mounted display 100 on, and allows the user to hear sounds. The communication section 132 is an interface for transmission and reception of data to and from the image generating apparatus 200, and realizes communication by a known wireless communication technology such as Bluetooth (registered trademark). The motion sensor 134 includes a gyro sensor and an acceleration sensor, and acquires the angular velocity and acceleration of the head-mounted display 100.

As depicted in FIG. 1, the stereo cameras 110 are a pair of video cameras that capture images of a surrounding real space from left and right viewpoints in a field of view corresponding to the viewpoint of the user. Images which are captured with the stereo cameras 110 and in which the space surrounding the user appears are also called "camera images" hereinbelow. The camera images can also be said to be images in which objects that are present in the line-of-sight direction of the user (typically, on the front side of the user) appear. Data regarding values of measurement by the motion sensor 134 and images (camera images) captured with the stereo cameras 110 is transmitted to the image generating apparatus 200 via the communication section 132 as necessary.

In the image display system according to the present embodiment, a play area defining a range in a real world in which the user who has the head-mounted display 100 on can move during play of an application is set. The play area can be said to be an area or range that is included in the space surrounding the user (the space of the real world around the user) and in which the user is permitted to move around while the user is viewing images in virtual reality (hereinbelow, also called "VR images"). In a case where the user is about to move out of the play area or has moved out of the play area during play of the application, the image display system gives the user a warning with contents to call her/his attention or contents to prompt her/him to return to the play area.

In the present embodiment, the image display system 10 executes a tracking process of tracking motions of the user who has the head-mounted display 100 on, and causes the head-mounted display 100 to display VR images of the field of view that changes on the basis of results of the tracking. Here, the image display system 10 collates camera images captured with the stereo cameras 110 with an environmental map that has been acquired in advance, and acquires the position and posture of the head-mounted display 100 at a predetermined rate.

There are widely known technologies to estimate a position and a posture of a mobile body including a camera with use of an environmental map. An environmental map is simply called a map in the following explanation. In the present embodiment, the map needs to be generated according to the environment of each user who uses the image display system. Because of this, as a preparatory stage for executing an application such as a VR game, the user thoroughly and evenly looks around the surrounding space in various directions, and captures, with the stereo cameras 110, images of real objects such as furniture, walls, or floor surfaces. The image display system 10 generates map data by collecting the camera images and acquiring three-dimensional distribution of feature points on the real object surfaces.

In order to realize an application highly precisely, it is vital to generate a map that reflects a sufficient amount of information related to real objects by performing the preliminary look-around action exhaustively. The information related to the real objects is also useful for precisely detecting the play area described above. Because of this, the image generating apparatus 200 of the present embodiment causes the head-mounted display 100 to display images to be guides of the look-around action, and allows the user to perform the necessary look-around action naturally without difficulty.

FIG. 6 is a block diagram depicting functional blocks of the image generating apparatus. As described above, the image generating apparatus 200 executes typical information processing to cause the storyline of a VR game to progress, communicate with a server, and so on, and FIG. 6 in particular depicts functional blocks related to map generation and play area setting in detail. Note that at least some of functions of the image generating apparatus 200 depicted in FIG. 6 may be implemented by a server connected to the image generating apparatus 200 via a network or may be implemented by the head-mounted display 100.

In addition, the plurality of functional blocks depicted in FIG. 6 can be realized by constituent elements such as the CPU 222, the GPU 224, the main memory 226, and the storage section 234 depicted in FIG. 4 if they are realized by hardware, and can be realized by computer programs that implement the functions of the plurality of functional blocks if they are realized by software. Accordingly, those skilled in the art understand that the functional blocks can be realized in various forms such as by only hardware, by only software, or by a combination of hardware and software, and what realizes them is not limited to either of them.

The image generating apparatus 200 includes a data processing section 250 and a data storage section 252. The data processing section 250 executes various types of data processing. The data processing section 250 performs transmission and reception of data to and from the head-mounted display 100 and the controller 140 via the communication section 232, the output section 236, and the input section 238 depicted in FIG. 4. The data storage section 252 stores data to be referred to or updated by the data processing section 250.

The data storage section 252 includes an application storage section 254, a play area storage section 255, a map storage section 256, and a visually recognized area storage section 257. The application storage section 254 stores data regarding an application (a VR game in the embodiment) that generates VR images. The play area storage section 255 stores data related to a play area. The data related to the play area includes data representing positions of a point cloud that forms the boundary of the play area (e.g., the coordinate values of each point in the world coordinate system).

The map storage section 256 stores map data for estimating the position and posture of the head-mounted display 100 (i.e., the position and posture of the user who has the head-mounted display 100 on). The map data according to the present embodiment is data including, in association with each other, a map representing the distribution in a three-dimensional space of feature points extracted from a camera image and key frames which are the source of extraction of the feature points. The key frames are images that are generated on the basis of the camera image and that include a predetermined number of feature points or more. Each key frame is associated with the position and line-of-sight direction of the head-mounted display 100 of the time when the key frame has been captured.

The visually recognized area storage section 257 stores data representing an area visually recognized by the user in the space around the head-mounted display 100 (stated differently, the space around the user) (stated differently, an area that has been in the line-of-sight direction of the user; hereinbelow, also called a "visually recognized area").

The data processing section 250 includes a system section 260, an application executing section 290, and a display control section 292. Functionalities of a plurality of these functional blocks may be implemented by computer programs. The CPU 222 and the GPU 224 of the image generating apparatus 200 may realize the functions of the plurality of functional blocks described above, by reading out the computer programs described above from the storage section 234 or a recording medium onto the main memory 226 and executing the programs.

The application executing section 290 reads out, from the application storage section 254, data regarding an application selected by the user (a VR game in the embodiment), and executes the application selected by the user. The application executing section 290 generates results of execution of the application according to the position and posture of the head-mounted display 100 (stated differently, the position and posture of the user) estimated by the system section 260 (a position estimating section 272 described later).

The display control section 292 transmits, to the head-mounted display 100, data regarding various images generated by the system section 260 and the application executing section 290 (e.g., VR images or AR images), and causes the display section 124 (display panel) of the head-mounted display 100 to display the images. Note that the display control section 292 may transmit data regarding sounds to the head-mounted display 100 and cause the sound output section 126 of the head-mounted display 100 to output the sounds.

The system section 260 executes system processing related to the head-mounted display 100. The system section 260 provides common services to a plurality of applications (e.g., VR games) for the head-mounted display 100. The common services include play area setting, map data generation and setting, and user position estimation. The system section 260 includes a camera image acquiring section 262, a play area setting section 264, a line-of-sight direction detecting section 266, a look-around screen generating section 268, a map generating section 270, the position estimating section 272, and a warning processing section 274.

The camera image acquiring section 262 acquires camera images captured with the stereo cameras 110 and transmitted from the head-mounted display 100. The play area setting section 264 executes various types of processing related to play area setting. Specifically, the play area setting section 264 sets a play area on the basis of camera images acquired by the camera image acquiring section 262 and user operation input via the controller 140. The play area setting section 264 stores data related to the set play area on the play area storage section 255.

The play area setting section 264 includes a play area detection function to auto-detect a play area from the space surrounding the user who has the head-mounted display 100 on, on the basis of camera images acquired by the camera image acquiring section 262. Note that the play area setting section 264 may include a play area editing function to accept user operation for editing an auto-detected play area, and may change the shape of the play area according to the operation.

On the basis of the angular velocity and acceleration of the head-mounted display 100 sensed by the motion sensor 134 of the head-mounted display 100 and images of the surrounding space captured with the stereo cameras 110, the line-of-sight direction detecting section 266 detects the position and posture of the head of the user who has the head-mounted display 100 on. The line-of-sight direction detecting section 266 further detects the viewpoint position and line-of-sight direction of the user on the basis of the position and posture of the user's head. Known technologies may be used for the detection of the position and posture of the user's head and the viewpoint position and line-of-sight direction of the user.

The look-around screen generating section 268 generates data regarding a look-around screen which is a screen for prompting the user to perform a natural look-around action, in a period of map data generation. The look-around screen includes a synthesized image (AR image) on which objects representing the surfaces of real objects based on the distribution of feature points detected until then are superimposed on a camera image displayed by video see-through. The look-around screen generating section 268 presents, to the user, a situation where the range over which objects are displayed spreads along with the look-around action by the user and eventually the entire surrounding space is filled with objects. As a result, the user can actually feel that the surfaces of real objects get detected owing to her/his look-around action, and is motivated to perform the action to look around the surrounding space.

The map generating section 270 analyzes camera images of various azimuths that are captured when the user looks around the surrounding space, and generates map data. The map generating section 270 stores the generated map data on the map storage section 256. For example, the map generating section 270 ends the map data generation when a predetermined number of camera images or more have been input with regard to every azimuth.

On the basis of the map data stored on the map storage section 256 and the camera images acquired by the camera image acquiring section 262, the position estimating section 272 estimates the position and posture of the user in the real world, and, stated differently, estimates the position and posture of the user in the play area. For example, the position estimating section 272 may collate the camera images and a plurality of key frames included in the map data and estimate the position and posture of the user on the basis of results of the collation and the position and line-of-sight direction of the head-mounted display 100 associated with each key frame.

In addition, the position estimating section 272 may estimate the position and posture of the user by using a known current position estimation technology such as simultaneous localization and mapping (SLAM). The warning processing section 274 executes a process of warning the user according to the relation between the boundary of the play area and the position of the user. For example, when the user approaches the boundary of the play area and the distance therebetween has become equal to or shorter than a predetermined value, the warning processing section 274 causes the head-mounted display 100 to output an image or a sound for giving a warning to that effect via the display control section 292. At this time, the warning processing section 274 may switch the display mode to a video see-through mode. As a result, the user can move to a safer position such as the center of the play area and resume the game play.

Figure 7:
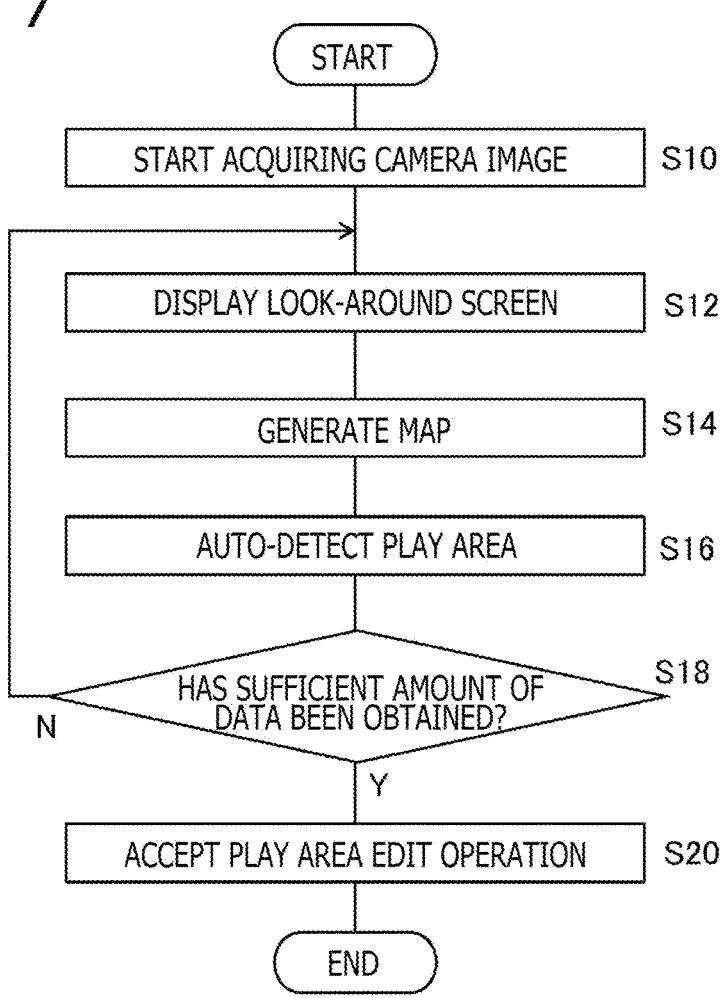
FIG. 7 is a flowchart depicting a processing procedure performed by the image generating apparatus related to map data generation and play area setting in the present embodiment.

Next, operation of the image display system realized by the configuration above is explained. FIG. 7 is a flowchart depicting a processing procedure performed by the image generating apparatus 200 related to map data generation and play area setting. The system section 260 of the image generating apparatus 200 causes the head-mounted display 100 to display a setting menu of the image display system 10. In a case where initial setting in the setting menu is selected by the user, the head-mounted display 100 starts transmission, to the image generating apparatus 200, of various types of sensor data and camera images in which the real space in the line-of-sight direction of the user appears.

The sensor data includes values of measurement by the motion sensor 134, and, for example, includes the angular velocity and acceleration of the head-mounted display 100. The camera image acquiring section 262 of the image generating apparatus 200 starts acquisition of camera images transmitted from the head-mounted display 100 (S10). In addition, the look-around screen generating section 268 generates data regarding a look-around screen including the camera images acquired by the camera image acquiring section 262.

The display control section 292 causes the display section 124 of the head-mounted display 100 to display the look-around screen (S12). At this time point, the look-around screen may be a video see-through screen that presents, to the user, an image representing an unmodified situation of the real space in the direction that the user faces. At this time, the display control section 292 may cause the head-mounted display 100 to display a message with contents prompting the user to look around the surrounding space.

Note that, in parallel with the displaying of the look-around screen, the line-of-sight direction detecting section 266 continuously detects the viewpoint position and line-of-sight direction of the user on the basis of measurement values of the motion sensor 134 and the like at a predetermined rate. Results of the detection are accumulatively stored on the visually recognized area storage section 257. As a result, the look-around screen generating section 268 causes displaying of objects on the look-around screen to reflect areas that have been visually recognized by the user in the look-around action.

The map generating section 270 of the image generating apparatus 200 generates map data by extracting feature points from camera images that are captured during the look-around action by the user and acquiring the three-dimensional position coordinates of the feature points (S14). The map generating section 270 stores the generated map data on the map storage section 256. The play area setting section 264 auto-detects a play area in the space surrounding the user, on the basis of the three-dimensional position coordinates (S16). Specifically, the play area setting section 264 detects the surfaces of real objects on the basis of the three-dimensional distribution of the feature points, and, on the basis of the detection, identifies a plane perpendicular to the direction of gravity represented by sensor data as a floor surface.

Then, the play area setting section 264 identifies the surfaces of real objects around the user such as furniture or walls relative to the floor surface as a reference surface, and detects, as a play area, an area of the floor surface where there are no such obstacles. The play area setting section 264 stores data regarding the play area on the play area storage section 255. Note that, in the processes in S14 and S16, data may gradually be formed with use of camera images that are collected along with the look-around action of the user.

The map generating section 270 and the play area setting section 264 repeat the processes in S14 and S16 by using new camera images, until a predetermined condition representing that an amount of map data sufficient for estimating the position of the user has been obtained is satisfied (N in S18). In the loop of the processes, the look-around screen generating section 268 superimposes, on a camera image on the look-around screen, objects representing the three-dimensional shapes of detected surfaces of real objects in the surrounding space, that is, surfaces on which the three-dimensional position coordinates of feature points have been obtained.

For example, the look-around screen generating section 268 generates polygon meshes representing the three-dimensional shapes of the surfaces of the real objects, on the basis of the three-dimensional distribution of the feature points. By superimposing the polygon meshes on the images of the corresponding real objects in the camera image, the situation where the detected real objects are covered with the polygon meshes is represented. As the map generating section 270 proceeds with the map generation, accordingly, the look-around screen generating section 268 increases areas with polygon meshes.

Note that the look-around screen generating section 268 provides, as special effects, areas represented without polygon meshes even if the surfaces of those areas have been detected. That is, the look-around screen generating section 268 limits areas to be represented with polygon meshes on one screen. As a result, a situation where detection is incomplete is created on the look-around screen, and the user is motivated to actively perform the look-around action and complete the detection process. The look-around screen generating section 268 can express that the surface detection is progressing irreversibly owing to the look-around action, by keeping polygon meshes that have been displayed once, without making any change, irrespective of subsequent changes of the field of view.

Suitably, the look-around screen generating section 268 makes the entire surrounding space on the look-around screen covered with polygon meshes at a time point when a sufficient amount of map data has been obtained in S18. Note that objects to represent the surfaces of real objects are not limited to polygon meshes. When it is determined in S18 that a sufficient amount of map data has been obtained, the map generating section 270 ends the map data generation process, and the play area setting section 264 ends the play area detection process (Y in S18).

Subsequently, via the display control section 292, the play area setting section 264 causes the head-mounted display 100 to display a play area edit screen on which objects representing a detected play area are superimposed on a camera image, and accepts edit operation performed by the user (S20). Objects representing the surfaces of real objects that have been caused to be displayed by the look-around screen generating section 268 at this time point may be stopped being displayed.

Note that, in S20, the play area setting section 264 may first accept user operation to correct the height of a detected floor surface, and then accept play area edit operation. The play area setting section 264 changes the shape of the play area according to user operation, that is, makes the play area larger or smaller according to the user operation. The play area setting section 264 updates data regarding the play area stored on the play area storage section 255 with the data that has been edited.

Figure 8:
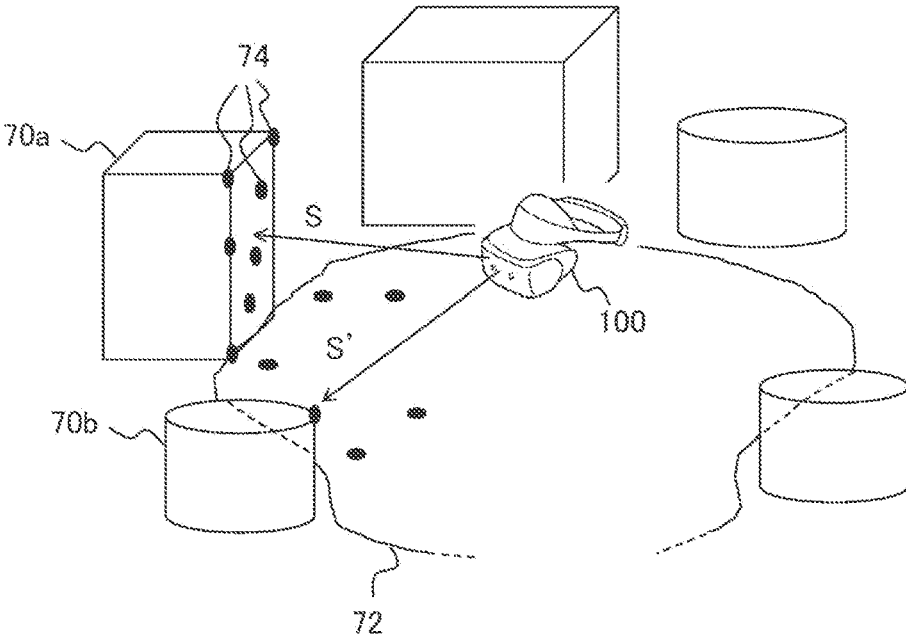
FIG. 8 is a figure schematically depicting a situation of a real space at the time of the map data generation performed by a map generating section according to the present embodiment.

FIG. 8 schematically depicts the situation of a real space at the time of the map data generation by the map generating section 270. The map generating section 270 identifies the three-dimensional position coordinates of feature points of real object surfaces on the basis of images of various directions captured with the stereo cameras 110 when the user who has the head-mounted display 100 on looks around the surrounding space and the position and posture of the head-mounted display 100 at the respective time points when the images have been captured. FIG. 8 depicts the situation where, as the user looks around the surrounding space, the three-dimensional position coordinates of feature points (e.g., feature points 74) on the surfaces of real objects (e.g., real objects 70a and 70b) captured in line-of-sight directions (e.g., directions S and S') are gradually identified.

As a result, areas in the real space where the positions of real object surfaces have been identified spread, and, along with this, the play area setting section 264 sets a boundary 72 of a play area along points before detected real objects or the like. In S18 in FIG. 7, the map generating section 270 determines that a sufficient amount of map data has been obtained when, for example, the user looks around the surrounding space 360° and it can be estimated that feature points have been obtained at a rate which is equal to or higher than a predetermined value for the surface of every real object. In practice, the map generating section 270 may divide directions as seen from the head-mounted display 100 into groups each with a predetermined number of directions, and it may be determined that a sufficient amount of map data has been obtained under a condition that a predetermined number of key frames have been obtained for every group.

In any case, the more thoroughly and evenly the user looks around the surrounding space and the more exhaustively and in detail the map data is generated, the more highly precise acquisition of positional information regarding the user can be performed at the time of play area setting or subsequent execution of an application. Because of this, as described above, the look-around screen generating section 268 presents guides for the look-around action, and also motivates the user to complete the detection process, by superimposing, on a video see-through image, objects that visualize surfaces being detected by the map generating section 270.

Figures 9A, 9B:
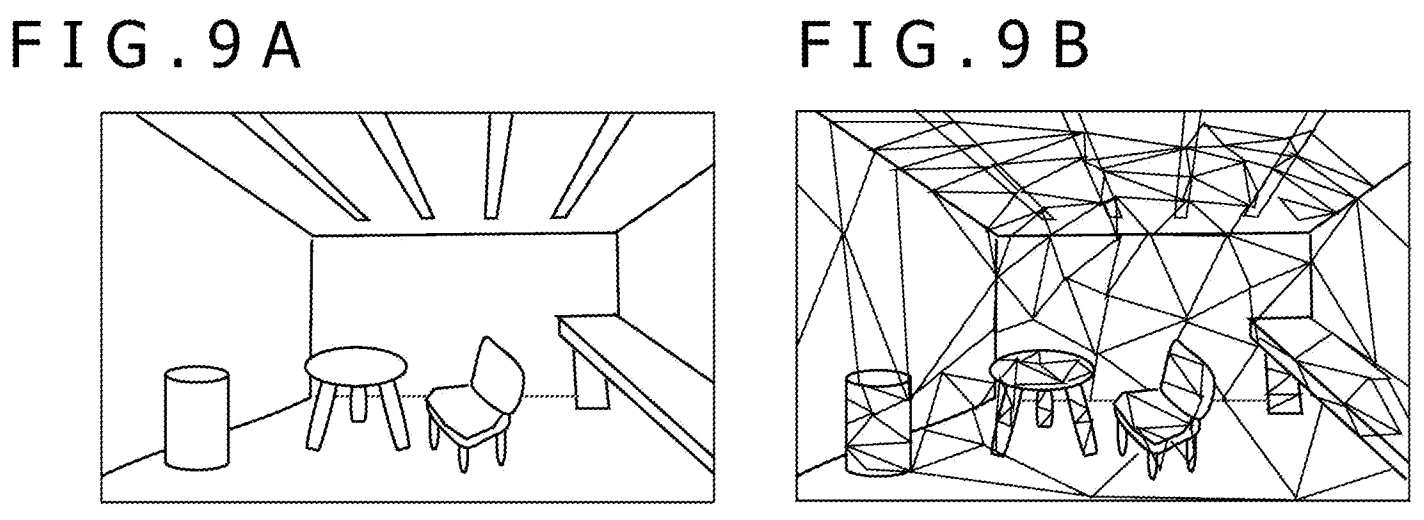

FIGS. 9A and 9B schematically depict changes of a look-around screen before and after the map data generation. FIG. 9A depicts a look-around screen before the map generation, and a camera image is displayed as it is since feature points have not been detected. In the example depicted in FIG. 9A, an image of a room where the user is present is displayed. Needless to say, when the user moves her/his head, and changes the line of sight, the field of view of the camera image also changes. In addition, in practice, the head-mounted display 100 realizes a stereoscopic view by displaying left-eye and right-eye images.

FIG. 9B depicts a look-around screen of the same field of view as that of FIG. 9A after a sufficient amount of map data has been obtained. That is, FIG. 9B depicts a state where the surfaces of real objects such as a chair and a table depicted in FIG. 9A have been obtained as the three-dimensional distribution of feature points. In the example depicted in FIG. 9B, the look-around screen generating section 268 superimposes three-dimensional polygon meshes as objects representing the surfaces of the respective real objects. When detection of real object surfaces is performed properly, the polygon meshes are displayed in a state where they are pasted onto the images of the real objects. Note that typical techniques in computer graphics can be applied to the process of generating polygon meshes to three-dimensional objects.

In the course of transition from the state of FIG. 9A to the state of FIG. 9B, the look-around screen generating section 268 displays, as a look-around screen, the situation where polygon meshes (hereinafter, simply called meshes) grow along with the progress of detection of real object surfaces. Note that, as described above, rather than performing the surface detection process itself, the look-around screen generating section 268 prompts the user to actively perform the look-around action, by selectively displaying meshes on the basis of motions of the line of sight of the user and intentionally leaving portions that appear to have not been detected.

Figure 10:
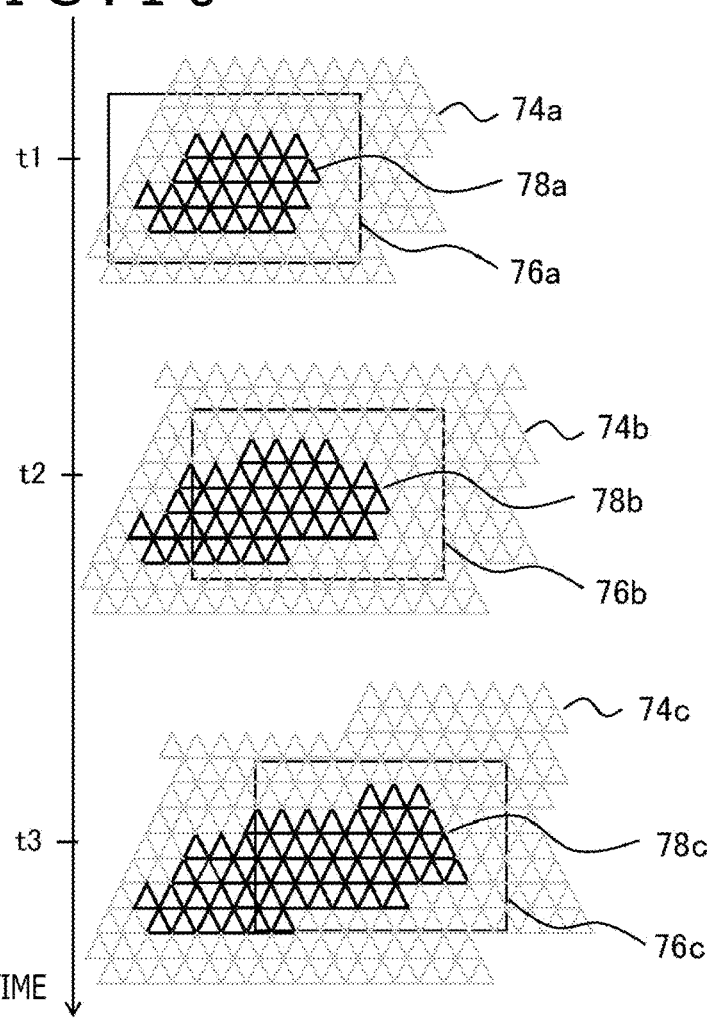
FIG. 10 is a figure schematically depicting a course in which a mesh is grown by a look-around screen generating section in the present embodiment.

FIG. 10 schematically depicts the course in which a mesh is grown by the look-around screen generating section 268. A downward direction along the vertical axis in FIG. 10 represents the passage of time, and fields of view 76a, 76b, and 76c of a look-around screen at three times t1, t2, and t3 and changes of the mesh are depicted. Here, small triangles schematically represent polygons included in the mesh.

Portions representing parts of the mesh on the look-around screen are depicted in black, and portions that are included in a detected surface but are not displayed as parts of the mesh are depicted in gray.

First, suppose that the surface of a real object has been detected in a range 74a in the surrounding space at the time t1. Here, in a case where the user is looking at the direction of the field of view 76a, the look-around screen generating section 268 displays, on the look-around screen, only a mesh 78a of a predetermined range including the central area of the field of view 76a. That is, the look-around screen generating section 268 pastes the mesh 78a only on a real object captured in the predetermined range including the central area, and makes images of other real objects visible as see-through images.

Specifically, the look-around screen generating section 268 acquires, from the line-of-sight direction detecting section 266, the viewpoint position and line-of-sight direction of the user of the time t1, and sets a view screen corresponding to the viewpoint position and line-of-sight direction. Further, the look-around screen generating section 268 acquires, from map data, acquired feature points in an angle range in the three-dimensional space, the angle range corresponding to the central area on the view screen. Then, the look-around screen generating section 268 generates the mesh 78a in the three-dimensional space on the basis of the distribution of the feature points, and then draws an image formed by projecting the mesh 78a onto the view screen.

By superimposing this image on the camera image, it is possible to express the situation where the real object captured in the central area is covered with the mesh. Note that, needless to say, in a case where there is an undetected surface in the central area of the field of view 76a, the look-around screen generating section 268 does not display a mesh corresponding to the undetected surface. The look-around screen generating section 268 may additionally display a mesh at a time point when the map generating section 270 has acquired feature points on the basis of a camera image in the field of view. In addition, the look-around screen generating section 268 stores an angle range corresponding to the central area of the field of view 76a and, in turn, an angle range over which the mesh 78a is displayed, on the visually recognized area storage section 257. This similarly applies to subsequent times.

As the user turns her/his face gradually to the right direction from the time t1 to the time t2, the range 74a over which the surface has been detected spreads to a range 74b owing to feature points extracted by the map generating section 270 from new camera images. Meanwhile, the look-around screen generating section 268 displays, on the look-around screen, portions that have entered the central area in a new field of view 76b, as a mesh 78b. At this time, the look-around screen generating section 268 keeps unchanged the mesh that has been displayed in the field of view until then such as the field of view 76a.

As the user further turns her/his face gradually to the upper right direction from the time t2 to the time t3, the range 74b over which the surface has been detected spreads to a range 74c owing to feature points extracted by the map generating section 270 from new camera images. Meanwhile, the look-around screen generating section 268 displays, on the look-around screen, portions that have entered the central area in a new field of view 76c, as a mesh 78c. At this time, the look-around screen generating section 268 keeps unchanged the mesh that has been displayed in the field of view until then such as the field of view 76a and the field of view 76b.

That is, the look-around screen generating section 268 basically visualizes meshes for the surfaces of real objects that are positioned in the central area of a field of view of a video see-through view. In addition, the look-around screen generating section 268 displays meshes that have been displayed in the field of view until then, without making any change on these meshes, and additionally displays meshes of surfaces that have newly entered the central area of the field of view.

Figure 11:
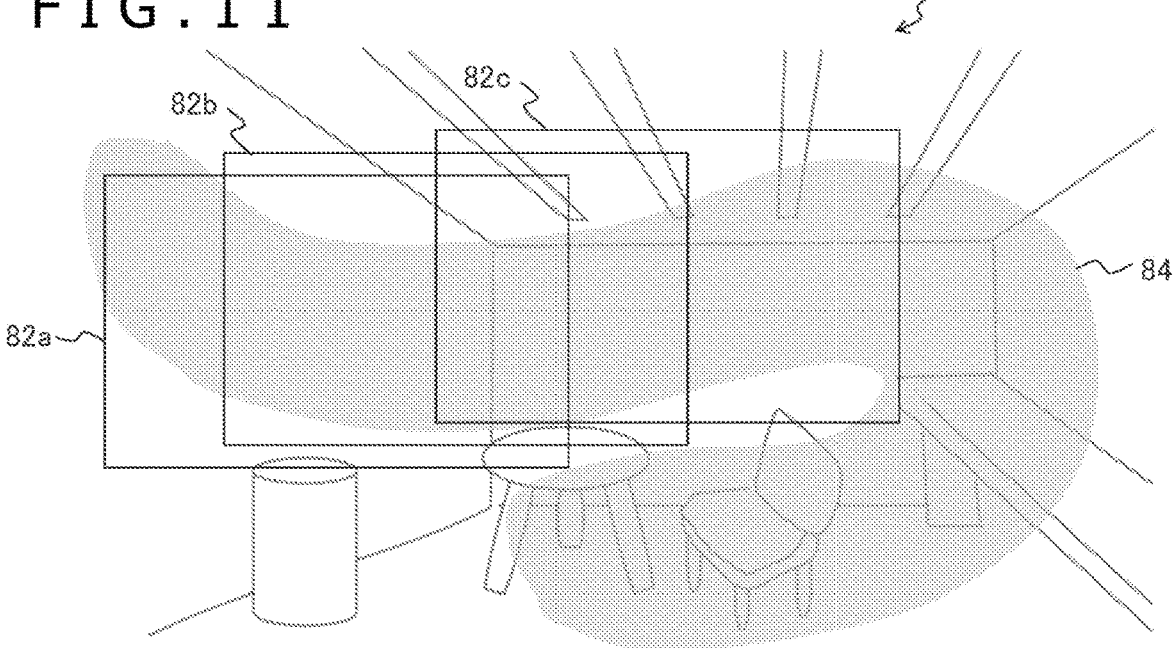
FIG. 11 is a figure schematically depicting a situation where a range represented by meshes spreads owing to a look-around action by a user in the present embodiment.

FIG. 11 schematically depicts the situation where a range represented by meshes spreads owing to a look-around action by a user. FIG. 11 depicts a three-dimensional space 80 which is a part of a room where the user is present. When the user performs a look-around action while watching a look-around screen, the field of view of a camera image on the screen gradually moves from a field of view 82a to fields of view 82b, 82c, and so on. As described above, the look-around screen generating section 268 sequentially adds meshes representing the surfaces of real objects that have newly entered the central area of the field of view. By repeating this, an area 84 in which meshes are displayed is made bigger. The area 84 includes, in practice, meshes pasted onto the surfaces of real objects.

That is, special effects can be created such that the range in the real space over which meshes are displayed spreads as the user changes her/his field of view. In addition, by limiting meshes that are to be newly added to those that are located in the central area of the field of view, the user can feel as if she/he were drawing meshes by changing the direction of her/his face. As a result, the user starts turning her/his face naturally to a direction where meshes are absent in such a manner as to paint the surfaces of real objects in the three-dimensional space.

The look-around screen generating section 268 keeps displaying additional meshes until it is determined that a sufficient amount of map data has been obtained as a result of the user turning her/his face to every azimuth, for example, and eventually, meshes that cover the entire surface as depicted in FIG. 9B get to be displayed in an almost omnidirectional range. By storing, on the visually recognized area storage section 257, an angle range which has entered the central area of the field of view and over which meshes have been displayed, the look-around screen generating section 268 re-displays also meshes that have entered the field of view again as a result of a subsequent look-around action.

By displaying, as objects to prompt a look-around action, polygon meshes having high affinity with the real object detection process, the user can intuitively understand that it is in the midst of the detection process. In addition, in practice, there are also various densities of meshes, depending on the densities of feature points acquired by the map generating section 270. For example, the density of a mesh of a surface such as a white wall where there are not so many feature points is lower, and its appearance does not change much even when the user approaches the surface or the user changes the direction in which she/he sees the surface. On the other hand, new feature points are acquired from a surface with many feature points or a real object with a complicated shape, when the user approaches the surface or real object or sees the surface or real object from its side, and the level of detail of the mesh also increases.

In such a manner, since the appearance of meshes changes depending on characteristics of real objects, the user naturally can identify targets which she/he should approach or see from its side, on the basis of changes of the meshes on the look-around screen. In such a manner, owing to changes that the user makes in the manner she/he performs a look-around action, the map generating section 270 can selectively acquire feature points with high resolution or acquire feature points of a portion that is difficult to see if the user looks in one direction, thereby enabling increase of the level of detail and precision of map data efficiently.

The size of the central area to which meshes are to be newly added in the field of view of the look-around screen is determined, by performing experiments or the like, to such a proper value that the user can actually feel that the range of meshes is spreading owing to motions of the user's head. In addition, in order to allow the user to look around without a sense of discomfort, it is vital to be able to widen the range of meshes to follow a quick motion of the head even if the head makes such a quick motion. In view of this, the look-around screen generating section 268 may take into consideration time required for a mesh drawing process, and look ahead at the position and posture of the user's head and, in turn, the viewpoint or field of view.

FIG. 12 depicts a time chart of each process performed when the look-around screen generating section 268 looks ahead at the position and posture of the user's head and causes meshes to be displayed. The right direction in FIG. 12 represents the passage of time, and the time over which a process depicted in each row is performed is represented by a rectangle. Note that it is not intended to limit the ratio of the processing time to this. As described above, on the basis of measurement values of the motion sensor 134 of the head-mounted display 100, the line-of-sight direction detecting section 266 regularly acquires the position and posture of the user's head. That is, as depicted in the top row in FIG. 12, the line-of-sight direction detecting section 266 acquires the position and posture of the head and, in turn, the viewpoint position or line-of-sight direction of the user of the times t1, t2, t3, t4, and so on at predetermined intervals.

Meanwhile, the time that elapses until the look-around screen generating section 268 looks ahead at the viewpoint or line of sight and completes drawing of meshes in the field of view corresponding to the viewpoint or line of sight looked ahead at is defined as Δt. The time Δt is estimated in advance on the basis of experiments or the like. On the basis of this, the look-around screen generating section 268 extrapolates changes of the viewpoint position or line-of-sight direction of the user until the time t1, to thereby predict the field of view to be obtained when Δt has elapsed (S30). Then, the look-around screen generating section 268 identifies meshes of real objects that should be displayed in the central area of the predicted field of view, and causes the display control section 292 to draw the meshes (S32).

As a result, at the timing of a time t1+Δt, the head-mounted display 100 can display meshes in the central area of the field of view of a camera image of the present timing (S34). On the basis of the position and posture of the head obtained at the time t2 during the process, the look-around screen generating section 268 predicts the field of view to be obtained when Δt has elapsed, and draws meshes of the central area. As a result, the head-mounted display 100 appropriately displays new meshes at the timing of a time t2+Δt. By repeating similar processes thereafter, the state where the growth of meshes follows motions of the head can be continued irrespective of the speed of the head.

According to the present embodiment described thus far, when the image processing apparatus generates, by using the stereo cameras included in the head-mounted display, a map representing a three-dimensional structure of a real space, the image processing apparatus displays a screen prompting the user to look around the surrounding space such that necessary captured images can be obtained. Specifically, the image processing apparatus causes an AR image on which objects representing the surfaces of real objects being detected are superimposed on a video see-through image to be displayed. At this time, the image processing apparatus makes bigger a range over which the objects are displayed, according to motions of fields of view of camera images.

That is, the image processing apparatus adds, to objects that have been displayed until then, objects that represent the surfaces of real objects that have entered the central area of the field of view. As a result, the user can feel that changing the direction of her/his face can increase areas in the real space that are filled with objects, and is motivated to perform the look-around action. By intentionally providing areas in which no object is displayed in the field of view, the field of view is guided to a direction toward such areas, and captured images of required azimuths can be obtained efficiently.

In addition, by displaying, as objects, polygon meshes that are pasted onto images of real objects, the user can intuitively understand that the surfaces of the real objects are being detected, and it is also possible to easily prompt the user to perform the look-around action according to characteristics of the real objects. As a result, a relatively exhaustive, highly precise map can be generated efficiently, and high-quality user experience can be provided in subsequent execution of an application.

The present disclosure has been explained thus far on the basis of the embodiment thereof. The embodiment illustrates an example, and those skilled in the art understand that various modification examples are possible in terms of combinations of constituent elements and processing processes of the embodiment and that such modification examples are also included in the scope of the present disclosure.

What is claimed is:

1. An information processing apparatus comprising:
processing circuitry configured to:
detect a surface of a first real object in a three-dimensional space on a basis of a camera image captured with a camera of a head-mounted display worn by a user;
generate map data representing information regarding the surface of the first real object as detected;
collate the map data and the camera image;
estimate a position of the user to be used for execution of an application;
generate a warning based on the position of the user and the map data; and
display a synthesized image at the head-mounted display, wherein a first object representing the surface of the first real object as detected is superimposed on an image of a corresponding surface in the camera image, in a period of generation of the map data.

2. The information processing apparatus according to claim 1, wherein the processing circuitry is further configured to display the first object over a range in the surface of the first real object as detected, the range being selected on a basis of a change of a line of sight of the user.

3. The information processing apparatus according to claim 2, wherein the processing circuitry is further comprised to display, in addition to the first object, a second object representing a surface of a second real object that has entered an area in a predetermined range in a field of view of the camera image owing to the change of the line of sight.

4. The information processing apparatus according to claim 1, wherein the processing circuitry is further comprised to display a polygon mesh representing a three-dimensional shape of the surface of the first real object as the first object.

5. The information processing apparatus according to claim 1, wherein the processing circuitry is further configured to:

detect a line-of-sight direction of the user at a predetermined rate, predict a field of view of the camera image to be obtained when a predetermined length of time has elapsed, on a basis of a change of the line-of-sight direction, determine a range over which the first object is to be displayed, based on the field of view of the camera image as predicted, and superimpose the first object on the camera image obtained when the predetermined length of time has elapsed.

6. The information processing apparatus according to claim 5, wherein the processing circuitry is further configured to store information related to a range in the three-dimensional space over which the first object has been displayed, and when the range has re-entered the field of view of the camera image, redisplay the first object.

7. The information processing apparatus of claim 1, wherein generating the warning comprises:

identifying a boundary of a play area within the map data;

measuring a distance between the position of the user and the boundary; and when the distance is less than a predetermined value, adjusting a setting of the head-mounted display.

8. The information processing apparatus of claim 7, wherein adjusting the setting of the head-mounted display includes at least one of outputting a warning image, outputting a warning sound, and switching a display mode of the head-mounted display to a see-through mode when the position of the user.

9. An information processing method comprising:

detecting a surface of a first real object in a three-dimensional space on a basis of a camera image captured with a camera of a head-mounted display worn by a user;

generating map data representing information regarding the surface of the first real object as detected;

collating the map data and the camera image;

estimating a position of the user to be used for execution of an application;

generating a warning based on the position of the user and the map data; and displaying a synthesized image at the head-mounted display, wherein a first object representing the surface of the first real object as detected is superimposed on an image of a corresponding surface in the camera image, in a period of generation of the map data.

10. The information processing method of claim 9, further comprising displaying the first object over a range in the surface of the first real object as detected, the range being selected on a basis of a change of a line of sight of the user.

11. The information processing method of claim 10, further comprising displaying, in addition to the first object, a second object representing a surface of a second real object that has entered an area in a predetermined range in a field of view of the camera owing to the change in the line of sight.

12. The information processing method of claim 9, further comprising displaying a polygon mesh representing a three-dimensional shape of the surface of the first real object as the first object.

13. The information processing method of claim 9, further comprising:

detecting a line-of-sight direction of the user at a predetermined rate;

predicting a field of view of the camera to be obtained when a predetermined length of time has elapsed, on a basis of a change in the line-of-sight direction;

determining a range over which the first object is to be displayed, based on the field of view of the camera as predicted; and superimposing the first object on the camera image obtained when the predetermined length of time has passed.

14. The information processing method of claim 13, further comprising:

storing information related to a range in the three-dimensional space over which the first object has been displayed; and when the range has re-entered the field of view of the camera image, redisplaying the first object.

15. A non-transitory computer readable medium having instructions stored thereon that, when executed by one or more processors, cause the one or more processors to:

detect a surface of a first real object in a three-dimensional space on a basis of a camera image captured with a camera of a head-mounted display worn by a user;

generate map data representing information regarding the detected surface of the first real object as detected;

collate the map data and the camera image;

estimate a position of the user to be used for execution of an application;

generate a warning based on the position of the user and the map data; and display a synthesized image at the head mounted display, wherein a first object representing the surface of the first real object as detected is superimposed on an image of a corresponding surface in the camera image, in a period of generation of the map data.

16. The non-transitory computer readable medium of claim 15, wherein the instructions further cause the one or more processors to display the first object over a range in the surface of the first real object as detected, the range being selected on a basis of a change of a line of sight of the user.

17. The non-transitory computer readable medium of claim 16, wherein the instructions further cause the one or more processors to display, in addition to the first object, a second object representing a surface of a second real object that has entered an area in a predetermined range in a field of view of the camera owing to the change in the line of sight.

18. The non-transitory computer readable medium of claim 15, wherein the instructions further cause the one or more processors to display a polygon mesh representing a three-dimensional shape of the surface of the first real object as the first object.

19. The non-transitory computer readable medium of claim 15, wherein the instructions further cause the one or more processors to:

detect a line-of-sight direction of the user at a predetermined rate;

predict a field of view of the camera to be obtained when a predetermined length of time has elapsed, on a basis of a change in the line-of-sight direction;

determine a range over which the first object is to be displayed, based on the field of view of the camera as predicted; and superimpose the first object on the camera image obtained when the predetermined length of time has passed.

20. The non-transitory computer readable medium of claim 19, wherein the instructions further cause the one or more processors to:

store information related to a range in the three-dimensional space over which the first object has been displayed; and when the range has re-entered the field of view of the camera image, redisplay the first object.

\* \* \* \* \*